J. O. GIBBINS.
ENGINE ALINER.
APPLICATION FILED APR. 24, 1908.
914,370.
Patented Mar. 2, 1909.
2 SHEETS—SHEET 1.
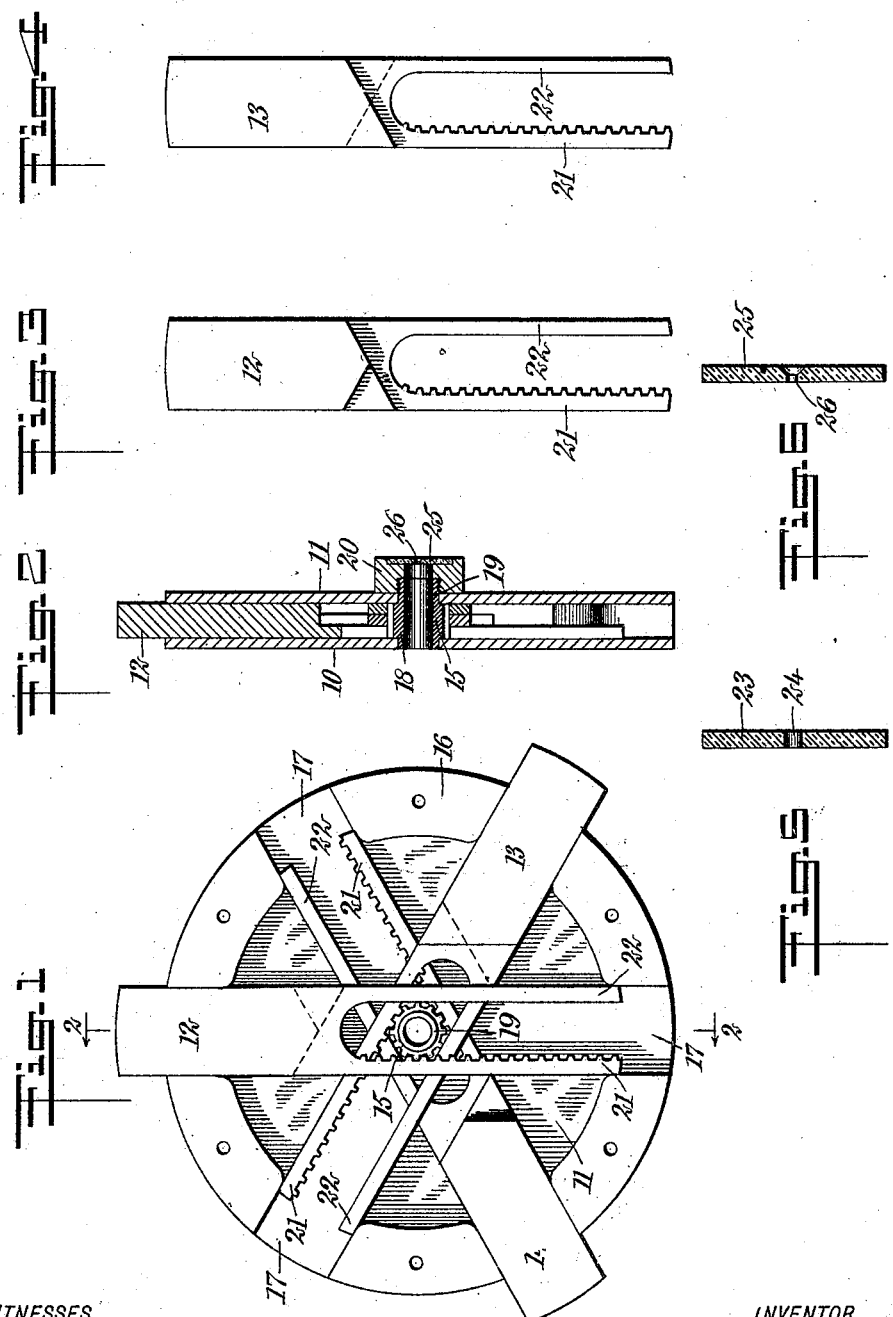
WITNESSES
INVENTOR
Joseph Oliver Gibbins
BY
ATTORNEYS

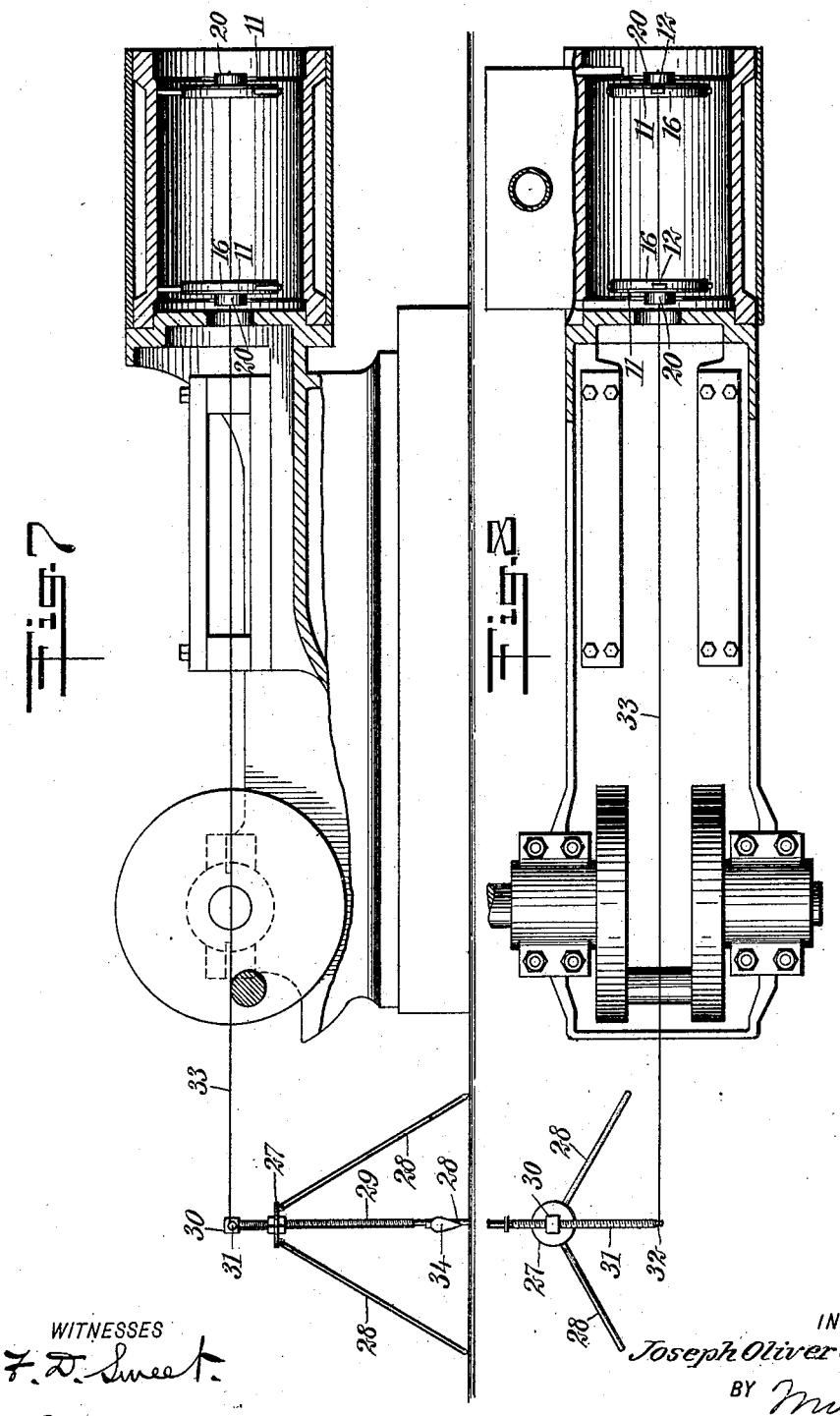

UNITED STATES PATENT OFFICE.

JOSEPH OLIVER GIBBINS, OF LOOKOUT, CALIFORNIA.

ENGINE-ALINER.

No. 914,370.    Specification of Letters Patent.    Patented March 2, 1909.

Application filed April 24, 1908. Serial No. 428,920.

*To all whom it may concern:*

Be it known that I, JOSEPH OLIVER GIBBINS, a citizen of the United States, and a resident of Lookout, in the county of Modoc and State of California, have invented a new and Improved Engine-Aliner, of which the following is a full, clear, and exact description.

This invention relates to certain improvements in apparatus adapted for use in lining up engines and the like, and more particularly to that type of apparatus in which a pair of centering devices is employed, one at each end of the cylinder, and each provided with radially-movable arms adapted to engage with the cylinder wall, to hold the apertures through the centering devices concentric with the cylinder. In connection with these centering devices, it is customary to employ a cord attached to the center of one of the centering devices, and extending freely through a small aperture in the center of the other centering device, and thence past the center of the crank shaft and intermediate the ends of the wrist pin, to an adjustable support.

My invention involves certain improvements in the centering device, whereby the latter is more readily adjusted and held in the proper position, and in which the cord passes through transparent plates, so that the straightness of the cord may be readily determined.

The invention also involves certain improvements in the support for holding the outer or free end of the cord.

Reference is to be had to the accompanying drawings, forming a part of this specification, in which similar numerals of reference indicate corresponding parts in all the figures, and in which—

Figure 1 is an end elevation of a centering device constructed in accordance with my invention, the face plate thereof being removed; Fig. 2 is a section on the line 2—2 of Fig. 1, the face plate being in position; Figs. 3 and 4 are elevations of two of the radially-movable arms employed in the centering device, and showing the reverse side thereof from that shown in Fig. 1; Figs. 5 and 6 are longitudinal sections on an enlarged scale of the glass plates employed in the centering devices; Fig. 7 is a longitudinal section through an engine, illustrating my improved apparatus in position for lining up the same; and Fig. 8 is a top plan view of the parts shown in Fig. 7 the engine cylinder being shown in section.

In my improved engine aliner, I employ two centering devices identical in form save as regards the apertured glass plate employed at the center.

In Figs. 1 to 4, inclusive, I have illustrated one of the centering devices, in which there is employed a casing made up essentially of two oppositely-disposed plates 10 and 11, and serving to support a plurality of radially-movable arms 12, 13 and 14, and a centrally-disposed gear wheel 15 for moving the arms radially in respect to the casing. As shown, one of the plates, 11, is provided with an annular flange 16 about the periphery thereof and of a thickness substantially equal to the thickness of the three arms 12, 13 and 14. The flange is provided with a plurality of apertures or openings 17, at diametrically-opposite points and of a size to receive and guide the arms. The distance between the inner surfaces of the plates 10 and 11 is substantially equal to the thickness of the arms and to the thickness of the flange 16. The plate 10 is secured directly to the flange 16, and serves to hold the arms in position. At the center of the casing, there is mounted the gear wheel 15, which is provided with reduced portions 18 and 19, extending through the plates 10 and 11, and fitting closely therein but sufficiently loose to permit the rotation of the gear wheel, which latter engages with the inner surfaces of the plates and is held against longitudinal movement thereby. At the outer end of the reduced portion 19, there is secured a nut 20, by means of which the gear wheel may be freely rotated.

Each of the arms 12, 13 and 14, is provided with two oppositely-disposed parallel bars 21 and 22, spaced apart a distance substantially equal to the diameter of the gear wheel. One of these bars, preferably the bar 21, constitutes a rack bar and is provided with a plurality of teeth engaging with the gear. The bars of the several arms are of a thickness substantially equal to one-third the thickness of the body of the arms, and the arms are so arranged that they all engage with the gear wheel. The bars of one of the arms, as, for instance, the arm 12, are in engagement with the plate 10, and their outer surfaces are in engagement with the outer surface of the arm. The bars of another arm, for instance, the arm 14, are in engagement with the plate 11, while the bars of the other arm 13, are intermediate the two plates and intermediate the bars of the other two arms. The total length of each arm and its bars is substantially equal to the diameter of the casing, so that when the gear wheel is rotated to bring all of the bars inward to their limiting position, they will not extend beyond the casing. By rotating the gear wheel in the reverse direction, all of the bars may be moved outwardly until their outer ends are at a distance from the circumference of the casing, substantially equal to the radius of the casing.

I provide two of the centering devices constructed substantially as above described, and in the outer end of the nut 20 of one of them, I provide a glass plate 23, substantially as shown in Fig. 5. This plate is provided with an aperture 24 therein, slightly greater than the diameter of the cord which I desire to employ. The nut 20 of the other centering device is provided with a glass plate 25, substantially as shown in Fig. 6, and an aperture 26 therein of substantially the same size as the cord to be employed. The outer end of the aperture 26 in the last-mentioned plate is preferably countersunk to receive a knot on the end of the cord. The glass plates may be held in place in any suitable manner and substantially concentric with the openings through the gear wheels. The apertures in the plates are materially smaller than the apertures through the gear wheels, so that the alining cord contacts solely with the glass.

In connection with the centering device above described, I employ a tripod or support for holding the opposite end of the cord. This tripod preferably includes a bearing plate 27, supported by suitable legs 28 and having a threaded rod 29 extending therethrough and vertically adjustable. The threaded rod 29 carries at its upper end a head 30, through which extends a horizontally disposed threaded rod 31. The end of the rod 31 is provided with a slight groove 32 to receive the cord 33, which latter extends over the rod 31 and terminates in a depending weight 34.

In the operation of my improved aliner, the piston and one cylinder head being removed, the two centering devices are inserted within the cylinder adjacent opposite ends thereof, and the concentric pinions or gear wheels 15 are rotated to extend the arms into engagement with the inner surface of the cylinder wall, and to securely hold the centering devices in position. The centering device having the glass plate 25, is placed at the end of the cylinder farthest from the crank shaft and the cord 33 is extended through the glass plate 25 and provided with a knot at its end to prevent the cord from pulling through the plate. The opposite end of the cord having the weight 34, is suspended over the end of the rod 31, and by the vertical and horizontal adjustment of the rods 29 and 31, the cord is brought to such a position that it extends through the aperture 24 of the glass plate 23 without touching the sides thereof. The crank shaft is then adjusted to such a position that the cord crosses the wrist pin half way between the ends of the latter, and across the center of the crank shaft. With the crank shaft supported in this position, the bearings may be rebabbitted or otherwise adjusted to properly support the shaft.

By providing the centering devices with transparent plates, substantially as above described, it is possible for a person adjacent the tripod or support, to glance along the line and through the glass plate 23, to ascertain more readily the direction in which the end of the rod 31 must be adjusted to bring the cord out of contact with the sides of the aperture 24. The aperture is only very slightly larger than the cord, and, therefore, when the latter contacts with the side of the aperture, the exact position of the cord within the cylinder in respect to the position of the cord outside of the cylinder, may be noted and the adjustment much more readily secured.

Having thus described my invention, I claim as new and desire to secure by Letters Patent:

1. A centering device for engine aliners, comprising a casing, including oppositely-disposed end plates, a plurality of radially-disposed arms mounted intermediate said end plates and extending outwardly from said casing, each of said arms having oppositely-disposed parallel bars at its inner end, one of said bars comprising a rack bar, a pinion within said casing and intermediate the two bars of each arm, for moving said arms simultaneously longitudinally, said pinion having an axial opening therethrough, and a transparent plate having an aperture concentric with said pinion.

2. A centering device for engine aliners, comprising a casing having oppositely-disposed end plates each having an aperture therethrough, one of said plates being provided with an annular flange spacing the end plates apart, a plurality of radially-disposed arms extending outwardly through said flange, each of said arms having the inner end thereof provided with oppositely-disposed parallel bars, one of which comprises a rack bar, a pinion within said casing and held against longitudinal movement by said plates and having reduced portions extending into apertures in said plates, said pinion having positive engagement with the rack bar of each of said arms, a nut on the outer end of one of said reduced end portions, and a glass plate carried by said nut, said plate having an aperture therethrough concentric with said pinion and nut, and said pinion and nut having an axial aperture therethrough larger than the aperture through said glass plate.

In testimony whereof I have signed my name to this specification in the presence of two subscribing witnesses.

JOSEPH OLIVER GIBBINS.

Witnesses:
C. J. FULCHER,
GEORGE KREUGER.